United States Patent [19]
Barbee et al.

[11] Patent Number: 5,392,124
[45] Date of Patent: Feb. 21, 1995

[54] METHOD AND APPARATUS FOR REAL-TIME, IN-SITU ENDPOINT DETECTION AND CLOSED LOOP ETCH PROCESS CONTROL

[75] Inventors: Steven G. Barbee, Dover Plains; Tony F. Heinz, Chappaqua, both of N.Y.; Ulrich Höfer, Munich, Germany; Leping Li, Poughkeepsie; Victor J. Silvestri, Hopewell Junction, both of N.Y.

[73] Assignee: International Business Machines Corporation, Armonk, N.Y.

[21] Appl. No.: 169,876

[22] Filed: Dec. 17, 1993

[51] Int. Cl.$^6$ ............................................. G01B 11/06
[52] U.S. Cl. .................................. 356/381; 156/626; 356/382
[58] Field of Search ............... 356/382, 381, 372, 369; 156/626

[56] References Cited

U.S. PATENT DOCUMENTS

| | | | |
|---|---|---|---|
| 3,437,811 | 4/1969 | Willis et al. | 250/83.3 |
| 4,141,780 | 2/1979 | Kleinknecht et al. | 156/626 |
| 4,198,261 | 4/1980 | Busta et al. | 356/382 |
| 4,240,048 | 12/1980 | Zumsteg | 332/7.51 |
| 4,289,188 | 9/1981 | Mizutani et al. | 156/626 |
| 4,367,044 | 1/1983 | Booth, Jr. et al. | 356/357 |
| 4,454,001 | 6/1984 | Sternheim et al. | 156/626 |
| 4,462,860 | 7/1984 | Szmanda | 156/626 |
| 4,496,425 | 1/1985 | Kuyel | 156/626 |
| 4,555,767 | 11/1985 | Case et al. | 364/563 |
| 4,717,446 | 1/1988 | Nagy et al. | 156/626 |
| 4,767,495 | 8/1988 | Nishioka | 156/626 |
| 4,826,321 | 5/1989 | Coates et al. | 356/351 |
| 4,975,141 | 12/1990 | Greco et al. | 156/626 |
| 4,998,021 | 3/1991 | Mimasaka | 250/560 |
| 5,072,451 | 12/1991 | Okazaki et al. | 252/582 |
| 5,190,614 | 3/1993 | Leach et al. | 156/626 |
| 5,229,038 | 7/1993 | Uchino et al. | 252/582 |
| 5,294,289 | 3/1994 | Heinz et al. | 156/626 |
| 5,310,918 | 5/1994 | Uchino et al. | 546/276 |

FOREIGN PATENT DOCUMENTS

| | | |
|---|---|---|
| 59-229823 | 12/1984 | Japan . |
| 03-120386 | 5/1991 | Japan .......................... H01L 21/202 |
| 63-229718 | 9/1991 | Japan .......................... H01L 21/302 |
| 5042382 | 2/1993 | Japan . |

OTHER PUBLICATIONS

IBM Technical Disclosure Bulletin, vol. 24, No. 1A, pp. 49-54, Jun. 1981, Case, et al., "Transparent Film Thickness Measurement".

(List continued on next page.)

*Primary Examiner*—Richard A. Rosenberger
*Assistant Examiner*—Jason D. Eisenberg
*Attorney, Agent, or Firm*—Michael J. Balconi-Lamica

[57] ABSTRACT

A method and apparatus for detecting an etching endpoint of a film on a substrate whereby a first excitation beam of light having a prescribed wavelength is provided, the first light beam substantially containing only a first harmonic component of light at that wavelength. The first light beam is directed at a prescribed incident angle to an interface between the film and the substrate, the first light beam being reflected off the interface to thereby provide a second light beam, the second light beam containing the first harmonic component of the first light beam and a generated second harmonic component. The generated second harmonic component is detected and a first output signal representative thereof is provided. A generated second harmonic component reference of the first light beam is produced and a second output signal representative of a generated second harmonic component reference is provided. The detected second harmonic component of the first light beam is normalized, as a function of the first and second output signals, in real-time, and a third output signal representative of an occurrence of a prescribed change in the normalized detected second harmonic component is provided. The prescribed change corresponds to the etching endpoint of the film on the substrate.

40 Claims, 2 Drawing Sheets

OTHER PUBLICATIONS

IBM Technical Disclosure Bulletin, vol. 24, No. 11B, pp. 6036–6037, Coombs, "Missing Peak Algorithm Modification For Etch End-Point Detection".

IBM Technical Disclosure Bulletin, vol. 24, No. 12, p. 6450, Manning, et al., "Algorithm For Etch End-Point Detection Of Quartz Over Metal".

IBM Technical Disclosure Bulletin, vol. 25, No. 1, pp. 436–438, Hewig, et al., "In-Situ, Real-Time Thin-Film Refractive Index And Thickness Monitor".

IBM Technical Disclosure Bulletin, vol. 34, No. 2, pp. 340–341, O'Neill, et al. "In Situ Infrared Absorption Spectroscopy For Endpoint Detection".

Optical Society of America, B/vol. 8, No. 8, Aug. 1991, pp. 1766–1769, Kulyuk, et al. "Second-Harmonic Generation By An $SiO_2$-Si Interface: Includence Of The Oxide Layer".

METHOD AND APPARATUS FOR REAL-TIME, IN-SITU ENDPOINT DETECTION AND CLOSED LOOP ETCH PROCESS CONTROL

BACKGROUND OF THE INVENTION

1. Field of the Invention

The present invention generally relates to optical measurements, and more particularly, to a method and apparatus for detection of an endpoint in the fabrication of integrated circuits.

2. Discussion of the Related Art

Modern integrated circuit devices are complex structures formed by many repeated steps of material deposition, reaction, modification (e.g., annealing), and removal. These processes are common to the fabrication of integrated circuit devices. While typical dimensions of lateral features in integrated circuit devices are frequently in the range of several microns, the thickness of fabrication layers is often far smaller than this scale, sometimes down to the range of 10 nanometers. A thickness of 10 nm corresponds to approximately 50 atomic layers. It can be easily understood that precise measurement of the dimensions during processing is crucial to device performance and device yield in the manufacturing process.

One of the critical general issues during the manufacture of an integrated circuit device is the detection of a boundary during the removal of material. Material removal may occur by methods such as chemical etching or by a plasma process such as reactive ion etching. It is generally necessary to determine the time at which all of the desired material has been removed and for which the underlying layer has not been etched significantly. This determination generally constitutes detection of an end point.

In the removal of material, the etched material and the underlying material are frequently made of different compositions, such as silicon dioxide on a silicon layer. They may, however, differ primarily in their crystalline structure or doping level and not in their gross chemical composition. This poses particular challenges for end point detection during an etching process. For example, in the manufacture of bipolar transistors, the fabrication step of forming an emitter opening involves etching an area of a deposited layer of polycrystalline silicon down to an epitaxial (single crystal) layer. This operation may be performed by a wet chemical etching bath which does not present any obvious means for real-time etching end point detection.

The consequences of improper etching are, however, significant. Underetching will cause a degradation of the gain of the transistor, while over etching will result in a degraded contact between the intrinsic and extrinsic base regions. End point detection of etching is therefore important and critical for preventing over etching and for control of undercutting of stacked layers used in VLSI processing. Furthermore, end point detection can also prevent sidewall erosion due to unnecessary over etching.

While some etching processes may provide selective removal of the overlayer and a slow rate of removal of the underlying material, this is not always attainable in practice. A real manufacturing process has numerous constraints, such as obtaining high etch rates and using relatively safe chemicals. The manufacturing process step may also require a strongly anisotropic etch rate. These conditions collectively mean that a highly selective etch may not be available. In this later instance, the capability of monitoring the etching process during manufacturing of an integrated circuit device becomes of critical importance.

An etch end point must be accurately predicted and/or detected to terminate etching abruptly. Etch rates, etch times, and etch end points are difficult to consistently predict due to lot-to-lot variations in film thickness and constitution, as well as etch bath temperature, flow, and concentration variability. That is, an etch rate is dependent upon a number of factors, which include, etchant concentration, etchant temperature, film thickness, and the film characteristics. Precise control of any of these latter factors, for example, concentration control, can be very expensive to implement and thus be cost prohibitive.

Currently, most etch rate end point determination techniques depend on indirect measurement and estimation techniques. Some etch monitoring techniques rely on external measurements of film thickness followed by etch rate estimation and an extrapolated etch end point prediction. However, etch rate may vary due to batch-to-batch differences in the chemical and physical characteristics of the film or the etchant or for a variety of other reasons as outlined above. These extrapolation methods are simply inadequate.

Real-time, in-situ monitoring of an end point is preferred. Some in-situ techniques monitor the etch rate of a reference thin film. This may require additional preparation of a monitor wafer containing the reference thin film or a suitable reference may be unavailable. Still other techniques require physical contact of electrical leads with the wafer being etched and electrical isolation of those leads and associated areas of the wafer from the etchant. This presents problems associated with contamination, contact reliability and reproducibility, and physical constraints which affect ease of use in the manufacturing process or automation of the manufacturing process.

It would thus be desirable to provide a method and apparatus which provides real-time, in-situ monitoring of an etching end point of a film on the surface of a wafer being etched.

SUMMARY OF THE INVENTION

An object of the present invention is to provide a method and apparatus for overcoming the problems in the art discussed above.

Another object of the present invention is to provide a method and apparatus for providing real-time, in-situ end point detection of an etching process.

According to the invention, a method and apparatus for real-time, in-situ end point detection of an etching of a film on a substrate is as follows. The apparatus comprises a means for providing a first excitation beam of light having a prescribed wavelength and further substantially containing only a first harmonic component thereof. A directing means directs the first light beam at a prescribed incident angle to an interface between the film and the substrate, the first light beam being reflected off the interface to thereby provide a second light beam, the second light beam containing the first harmonic component of the first light beam and a generated second harmonic component, the second harmonic component thereof being generated as a result of the reflection of the first light beam off the interface. A detecting means detects the generated second harmonic component and provides a first output signal representative thereof. A means for producing a generated second harmonic component reference of the first light beam provides a second output signal representative of a generated second harmonic component reference. A normalizing means responsive to the first and second output signals normalizes the detected second harmonic component of the first light beam in real-time, providing a third output signal representative of an occurrence of a prescribed change in the normalized detected second harmonic component, the prescribed change corresponding to an etching endpoint of the film on the substrate.

BRIEF DESCRIPTION OF THE DRAWINGS

The foregoing and other teachings of the present invention will become more apparent upon a detailed description of the best mode for carrying out the invention as rendered below. In the description to follow, reference will be made to the accompanying drawings, in which.

DETAILED DESCRIPTION OF THE PREFERRED EMBODIMENTS

The method and apparatus according to the present invention shall be described in connection with semiconductor integrated circuit device manufacturing. Because semiconductor integrated circuit device manufacturing techniques are well known in the art, the present description will be directed in particular to elements and processes forming part of, or cooperating directly with, the novel method and apparatus according to the present invention. Elements and processes not specifically shown or described herein may be selected from those known in the art.

Figure 1:
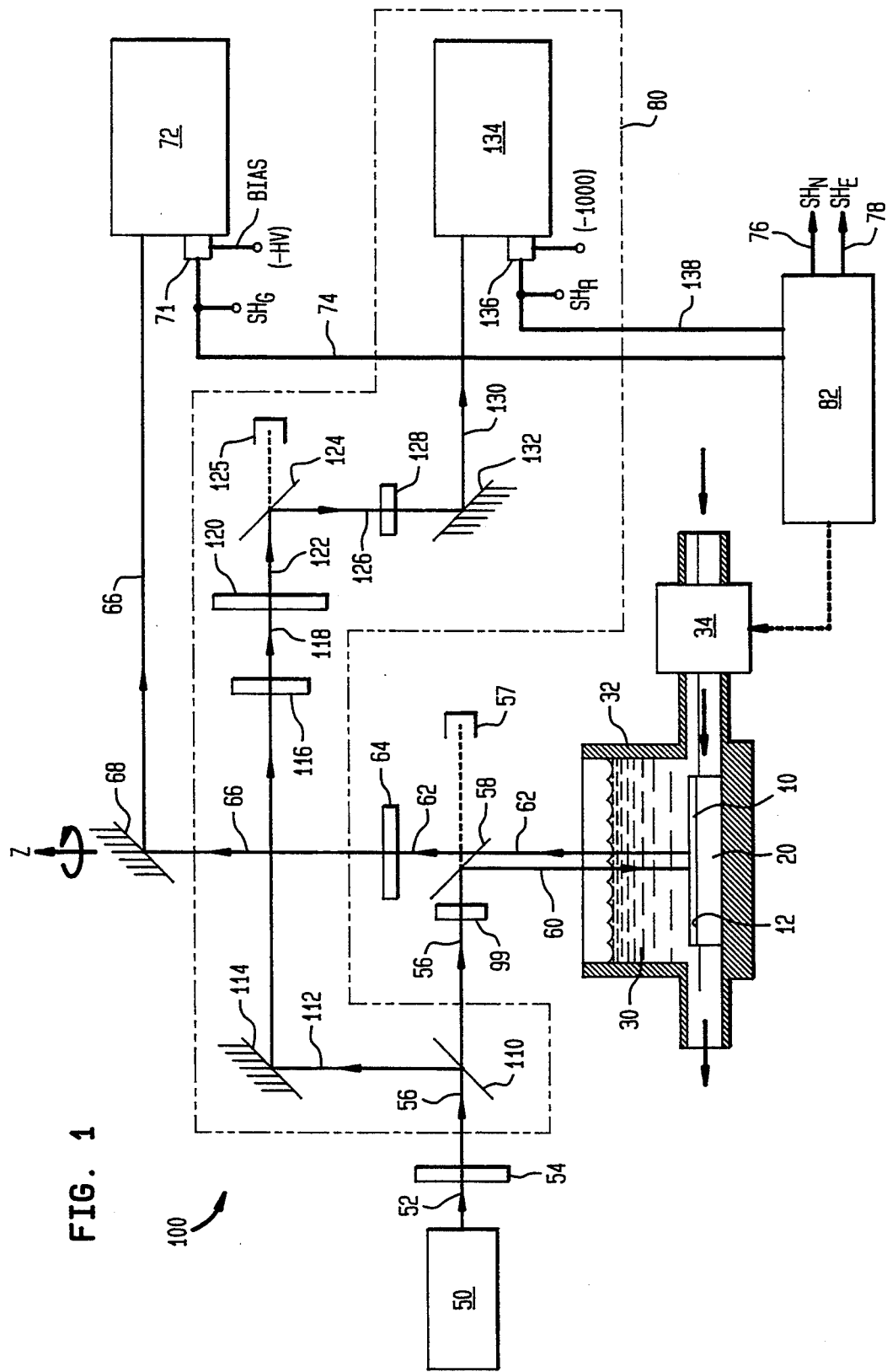
FIG. 1 illustrates an apparatus according to the present invention in conjunction with the etching of a film on a top surface of a substrate in a wet etching bath.

The present invention shall be described in connection with the etching of an oxide on a silicon substrate to facilitate an understanding of the present invention, however, the present invention is not limited thereto. Referring now to FIG. 1, a film 10 on top of substrate 20 with an interface 12, is placed in wet chemical etching bath 30 for the etching of film 10. Film 10 comprises, for example, an oxide ($SiO_2$) film having a thickness on the order of 120 nm. Substrate 20 comprises, for example, a silicon (Si) substrate having a <111> orientation. The wet chemical etching bath 30 or etching solution can comprise, for example, a buffered hydrofluoric (BHF) and water ($H_2O$) solution for etching of the $SiO_2$ film. Etching bath 30 is provided to etchant tank 32 via a pumping means 34, for introducing and circulating the etching bath 30 into tank 32.

Referring still to FIG. 1, an apparatus 100 for in-situ real-time end point detection of the etching of film 10 on substrate 20 according to the present invention is shown. A laser device 50 or excitation source, preferably comprising a YAG laser, as is well known in the art, provides a first infrared beam of light 52 having a prescribed wavelength of 1.06 microns. Such a YAG laser is preferable over other types of lasers, for example He—Ne lasers. The YAG laser advantageously provides light with very short and high power pulses. While laser device 50 is described as comprising a YAG laser with a wavelength of 1.06 microns, it should be noted that other excitation sources with different characteristics (such as fundamental frequency, pulse width, power, polarization, etc.) may be chosen according to a particular etching application (i.e., etching solution, film layer and substrate materials, etc.). A filtering means 54, comprising for example, an interference filter, filters the first infrared beam of light 52 to provide light beam 56. Light beam 56 comprises light which substantially contains only a first harmonic component ($w_{IR}$) of the first infrared beam of light 52 (i.e., fundamental light).

A light directing means 58 directs light beam 56 to the interface 12 between the film 10 and the substrate 20, thereby providing light beam 60. Light beam 60 is incident to the interface 12 at a prescribed incident angle. Preferably light directing means 58 comprises a specially coated dichroic mirror, such as, Part No. SWP-45-RS1064TP532-PW-2025-C, commercially available from CVI Laser Corporation of Albuquerque, N. Mex. More particularly, light directing means 58 comprises a specially coated dichroic mirror for most efficiently reflecting the fundamental light 56, wherein the light beam 60 comprises the reflected portion of the light beam 56. A residually transmitted portion of light beam 56 is captured and absorbed by beam stopper 57, beam stopper 57 comprising any suitable IR beam stopper known in the art for absorbing IR energy. Directing means 58, comprising the specially coated mirror, is also for most efficiently transmitting a generated second harmonic component light beam 62, as discussed further hereinafter. Furthermore, in the case of Si <111> orientation, the incident angle preferably comprises a zero degree (0°) angle, such that light beam 60 is substantially normal to the surface of substrate 20.

Light beam 60 thereafter reelects off the uppermost surface of film 10 and the interface 12 between film 10 and substrate 20 to thereby provide the second light beam 62. Light beam 62 contains the first harmonic component ($w_{IR}$) of the first light beam 52 and a generated second harmonic component ($w_{SHG}$) (light beam 60 comprises only the first harmonic component of light beam 52). Reflection of the light beam 60 from the interface 12 (i.e., the $SiO_2$/Si interface) results in the generation of the second harmonic component ($w_{SHG}$) of the light beam 62.

Referring to the configuration as shown in FIG. 1, light beam 52 can be characterized by an incident linearly polarized light having a prescribed polarization with respect to the mirror symmetry of the crystal orientation (i.e., the symmetry of the interface between the oxide layer and wafer). The angle of the prescribed polarization of the incident light with respect to the mirror symmetry axes of the interface 12 may be adjusted to obtain maximum generation of the second harmonic component of light. Optimal generation of the second harmonic component ($w_{SHG}$) from light beam 60 may be achieved either: i) by adjustably rotating a half-wave plate 99 positioned in the light path of light beam 56, the half-wave plate comprising a half-wave plate centered at the incident beam fundamental frequency ($w_{IR}$); or ii) by adjustably rotating the wafer 20, until an optimal signal is achieved. In instances where adjustably rotating wafer 20 are impractible, half-wave plate 99 advantageously provides a polarization rotator means for rotating the polarized light to optimize the second harmonic generation of light, thereby further increasing the signal-to-noise ratio obtained.

The second light beam 62 passes through specially coated dichroic mirror 58 and is thereafter filtered by filter 64. Filter 64 preferably comprises an interference filter for eliminating substantially all of the first harmonic component ($w_{IR}$) from the second light beam 62, thereby providing third light beam 66. The third light beam 66 comprises light which substantially contains the generated second harmonic component ($w_{SHG}$) of light beam 62. That is, interference filter 64 removes substantially most of the first harmonic component from the second beam of light 62 while allowing passage of the reflected, generated second harmonic component ($w_{SHG}$) of the light beam 62 therethrough.

The third light beam 66 is then reflected off of mirror 68 directed into a monochrometer 72. Monochrometer 72 may comprise any suitable commercially available monochrometer. The light beam 66 entering the monochrometer 72 may be further "purified" by a light color dispersing element (namely, a grating (not shown)) to allow only the pure second harmonic light to pass through a desired narrow slit and fall onto (or hit) a photomultiplier tube (PMT) 71 of monochrometer 72. Monochrometer 72 provides a first output signal, $SH_G$, on signal line 74 representative of the amount of second harmonic light received by photomultiplier tube 71 and further corresponding to a detected second harmonic component ($w_{SHG}$) of light beam 62 generated and reflected at the interface 12 from beam 60. A high negative voltage (HV) bias is applied to PMT 71 for the operation thereof. For instance, a typical biasing voltage comprises a negative voltage on the order of $-1000$ volts. A range of HV bias voltages may be applied to any particular PMT; however, both output signal and noise in the output signal increase with voltage. Thus, an appropriate PMT (such as low noise, high quantum yield), well suited for the detecting a desired wavelength of light, should be utilized. This is an important consideration for obtaining an optimal high signal-to-noise (S/N) ratio.

A second harmonic component reference means 80 for producing a generated second harmonic component reference of the first light beam 52, and further for providing a second output signal representative of a generated second harmonic component thereof is shown in FIG. 1. Second harmonic component reference means 80 is comprised of the following. A beam splitter 110 is positioned between the first interference filter 54 and half-wave plate 99 so as to partially reflect and partially transmit the light beam 56, wherein the partially transmitted portion of light beam 56 impinges upon the directing means 58 through half-wave plate 99. The partially reflected portion of light beam 56 comprises a fourth light beam, designated by 112 in FIG. 1, and is incident upon mirror 114. Mirror 114 directs fourth light beam 112 to a third interference filter 116 for removing all but the fundamental component of light beam 112. Filter 116, comprises an interference filter, similar to filter 54, for filtering light beam 112 to provide light beam 118. Light beam 118 comprises light which substantially contains only a first harmonic component ($w_{IR}$) of the fourth light beam 112 (i.e., a first harmonic component ($w_{IR}$) of first light beam 52). Light beam 118 thereafter passes through a reference medium 120, preferably comprising a crystal quartz plate. Reference medium 120 receives the light beam 118 on a first side thereof and provides a fifth light beam 122 exiting from a second side thereof. The transmitted reference light beam 122 contains a first harmonic component ($w_{IR}$) and a generated reference second harmonic component ($w_{SHGR}$). A specially coated dichroic mirror 124 (such as Part No. LWP-45-RS532-TP1064-PW-2025-C, commercially available from CVI Laser Corporation of Albuquerque, N. Mex.) is provided in the path of light beam 122 for optimally reflecting the second harmonic light ($w_{SHGR}$) of beam 122 and transmitting the fundamental frequency light ($w_{IR}$) of beam 122. Specially coated dichroic mirror 124 may comprises a suitable mirror with opposite reflection and transmission properties to that of directing means 58. The transmitted infrared portion of the light beam 122 is captured and absorbed by beam stopper 125, beam stopper 125 comprising any suitable IR beam stopper known in the art for absorbing IR energy. The reflected portion of fifth light beam 122, designated by light beam 126 is directed to a fourth interference filter 128 for filtering light beam 126. Filter 128, comprises an interference filter, similar to filter 64, for filtering light beam 126 to thereby further remove the first harmonic component ($w_{IR}$) from light beam 126 to provide light beam 130, wherein light beam 130 contains substantially the generated reference second harmonic component ($W_{SHGR}$) Of light beam 126. Light beam 130 is directed by mirror 132 to a second monochrometer 134. Monochrometer 134 may comprise any suitable commercially available monochrometer and is equipped with a photomultiplier tube 136 for receiving only the second harmonic component of the light beam 130. A biasing voltage (on the order of $-1000$ V) is applied to photomultiplier tube 136 similarly as discussed above with respect to PMT 71. Monochrometer 134 is suitable for detecting the second harmonic component ($W_{SHGR}$) Of light and provides a second output signal, $SH_R$, on output signal line 138, output signal $SH_R$ being representative of the generated reference second harmonic component ($w_{SHGR}$) of light beam 130.

A control means 82 is connected to signal lines 74 and 138 for receiving first and second output signals $SH_G$ and $SH_R$, respectively. Control means 82 may comprise a computer, or the like, for receiving signals $SH_G$ and $SH_R$, the computer further being programmed by known techniques for performing desired functions as will be described herein below. Control means 82 is responsive to the first and second output signals, $SH_G$ and $SH_R$, respectively, for normalizing the generated second harmonic component of the light beam 66 detected by said detection means 72 in real-time. Control means 82 is appropriately programmed to perform a division of the signal $SH_G$ by the signal $SH_R$ (i.e., $SH_G/SH_R$) to provide a real-time normalized output signal, $SH_N$. Control means 82 provides the real-time normalized output signal, $SH_N$, on output signal line 76, signal $SH_N$ providing an indication of the etching condition of the film 10 on the substrate 20.

Control means 82 also provides an output signal, $SH_E$, on output signal line 78, the output signal, $SH_E$, representative of an occurrence of a prescribed change in the normalized detected second harmonic light. Preferably the prescribed change corresponds to an etching endpoint of the film on the substrate. In further detail, control means 82: i) generates a sequence of curve fitting expressions in real-time for a successive series of a prescribed number of data points taken from the normalized output signal, $SH_N$; ii) performs a real-time derivative of the sequence of expressions; iii) determines an occurrence of a negative peak with an amplitude greater than a prescribed level in the real-time derivative, the peak occurring at a peak position representative of a precursor to an etching endpoint; and, iv) determines a prescribed change in the normalized detected second harmonic component representative of the etching endpoint as a function of the peak position. In further explanation thereof, a prescribed number of data points taken from the normalized output signal $SH_N$ may comprise nine data points, for example. With nine successive data points, a curve fitting expression, represented by $f(t,N)$, is generated (where t represents time and N equals 9, 10, 11, ...). Any well known curve fitting algorithm may be used. As a successive series of curve fitting expressions, represented by $f(t,N)$, are generated in real-time, real-time derivatives $f'(t,N-4)$ are performed, also. Any known suitable method for taking the derivative of a function or curve fitting expression may be used herein. A prescribed change, such as a negative peak in the real-time derivatives as a function of time, is indicative of an approaching etch end point. Control means 82 monitors the real-time derivative data and determines at what point in time a prescribed negative peak occurs. Based upon the position of the peak in time, control means 82 determines the prescribed change in the normalized detected second harmonic component that is representative of the etching endpoint as a function of the peak position.

Control means 82 is further responsive to the third output signal, $SH_E$, for controlling the termination of etching of the film on the substrate, control means 82 being operable for terminating the etching of the film i) in a first mode by adjusting an effective etchant concentration of an etching solution, and/or ii) in a second mode by physically removing the substrate from the etching solution. That is, in a first mode, control means 82 is operatively connected to pump 34 for controlling the same. In adjusting an effective etchant concentration of the etching solution, control means 82 may control pump 34 for diluting the etching solution to become more or less concentrated with the etchant as a function of the etching endpoint signal. That is, etching solution 30 may be neutralized or made to be a buffer solution by removing a flow of etchant chemicals into the bath and/or by the addition of chemicals for neutralizing the etching bath. In a second mode, control means 82 may be operatively connected to a robotic arm (not shown), the robotic arm being suitably arranged for physically raising and lowering a substrate into and out of the etching bath. Control means 82 may control the robotic arm to remove the substrate from the etching bath as a function of the etching endpoint signal.

For optimal performance and accuracy, the mirrors and beam splitter are appropriately aligned, in addition to the polarization adjustment previously mentioned with respect to half wave-plate 99, to optimize i) the generated second harmonic component of light reflecting from interface 12 between film 10 and substrate 20 and ii) the generated second harmonic component of light transmitted through the reference medium 120.

In operation, the apparatus 100 for in-situ real-time end point detection of the etching of film 10 on substrate 20 operates as follows. Substrate 20, having a <111> orientation, is positioned inside etchant tank 32 and the etching bath 30 is supplied to the tank via pump 34. At this time, laser 50 is energized to provide infrared light beam 52. Light beam 52 is filtered by interference filter 54 for removing all harmonic components of light beam 52 except a first harmonic component ($w_{IR}$), thereby providing light beam 56. Light beam 56 is directed towards the surface of substrate 20 by specially coated dichroic mirror 58. The directed light beam, indicated by numeral 60, is directed by specially coated mirror 58 to have a prescribed incidence angle with respect to the surface of substrate 20, for example zero degrees (0°). Incident light beam 60, containing only a first harmonic component ($w_{IR}$) of the infrared light 52, is reflected off of i) the uppermost surface of film 10, and ii) the interface 12 of $SiO_2/Si<111>$ upon the etching of film 10. Upon complete removal of film 10, the interface 12 changes from $SiO_2/Si<111>$ to solution/$Si<111>$. It is this interface change which gives rise to an abrupt change in the second harmonic signal.

The reflected light beam, indicated by numeral 62, contains a first harmonic component ($w_{IR}$) and a generated second harmonic component ($w_{SHG}$) as will be further explained. Generation of the second harmonic component ($w_{SHG}$) is due to the production of light at twice the frequency of the incident light beam upon the reflection of the incident light beam at the interface 12. The process can be considered as the combining of two photons of energy E to produce a single photon of energy 2E, i.e., the production of light of twice the frequency (or half the wavelength) of the incident light. This second harmonic component generation effect can also be generalized to the combining of photons of different energies, corresponding to different frequencies. The present invention advantageously utilizes this second harmonic component generation effect.

Briefly, the existence of the second harmonic component generation (SHG) effect is due to characteristics of high-intensity laser radiation. High intensity laser radiation is coherent and gives rise to collimated radiation when induced by a collimated pump beam. In suitable birefringent nonlinear crystals, the SHG process can be quite efficient. As such, it is widely used to generate new frequencies of light in conjunction with high intensity lasers. The SHG process is, however, forbidden (to a very good approximation) within the bulk of many materials. These are all materials exhibiting a center of symmetry (inversion or centrosymmetric materials). Centrosymmetric materials include essentially all liquids and gases (because the random molecular positions therein appear similar, regardless of viewing direction) as well as essentially all elemental solids. Important examples of centrosymmetric materials for the electronics industry include silicon, germanium, most metals and silicides, and most insulators, such as (amorphous) silicon dioxide. For these materials, the SHG process is appreciable only at surfaces and interfaces where the inversion symmetry of the bulk materials is broken. SHG from these materials is then dominated by the contribution of roughly one atomic layer of the material at a surface or interface. This provides the SHG process with the sensitivity to surface and interface properties, i.e., the amount of second harmonic radiation generated will be according to the amount by which the a boundary of a first material and the surface of a second material approach or diverge from one another.

Reflected light beam 62 passes through specially coated dichroic mirror 58 and is filtered by interference filter 64 for removing the first harmonic component ($w_{IR}$) from light beam 62 to provide light beam 66. Light beam 66 comprises essentially the generated second harmonic component ($w_{SHG}$) portion of light beam 62. Thereafter, light beam 66 is directed by mirror 68 into monochrometer 72, light beam 66 being subjected to further dispersion of light to allow only the generated second harmonic light to be received by the photomultiplier tube 71 of monochrometer 72. The output signal SH of monochrometer 72 is representative of an amount of second harmonic radiation generated by the reflection of light beam 60 from the interface 12 which corresponds to the interface between film 10 and substrate 20 before the etching end point and becomes a solution/-Si<111> interface after the etching end point (i.e., upon and subsequent to the removal of film 10).

Concurrently with generation of the output signal SH, a reference signal $SH_R$ representative of a reference second harmonic component ($W_{SHGR}$) Of light is generated. That is, light beam 56 is partially reflected by beam splitter 110 to provide light beam 112. Light beam 112, comprising substantially only a first harmonic component of light from laser 50, is thereafter directed by mirror 114 and filtered a second time by interference filter 116. Interference filter 116 provides light beam 118 from light beam 112, and ensures that light beam 118 contains only a first harmonic component ($w_{IR}$) of light. Filter 116 filters the light beam just prior to impingement of the light beam upon quartz reference medium 120. A reference light beam 122 is thereby provided by passage of light beam 118 through medium 120. The reference light beam 122 thus contains the first harmonic component ($w_{IR}$) and a generated reference second harmonic component ($W_{SHGR}$). A portion of light beam 122, designated by light beam 126, is thereafter directed by specially coated dichroic mirror 124 to filter 128. Interference filter 128 further removes the first harmonic component ($w_{IR}$) from light beam 126, thereby providing light beam 130. Light beam 130 contains substantially the generated reference second harmonic component ($W_{SHGR}$) of light beam 126. Light beam 130 is directed by mirror 132 to monochrometer 134. Monochrometer 134 thus selects and provides an output signal $SH_R$ representative of an amount of the generated reference second harmonic component ($w_{SHGR}$) of light passing through reference medium 120.

The output signals of monochrometer 72 and 134 are then input into control means 82, as previously indicated, for effecting a division of the signal $SH_G$ by the signal $SH_R$. The resultant signal, $SH_N$, on signal line 76, is the normalized detected second harmonic component signal and thus provides an indication of the etching condition of film 10 on substrate 20. That is, resultant signal $SH_N$ is indicative of the amount of the detected second harmonic component signal $SH_G$, normalized continuously against that of a reference detected second harmonic component signal $SH_R$, produced via use of the reference quartz plate 120. An advantage of continuously normalizing the detected second harmonic component signal $SH_G$ is that adverse effects due to laser fluctuations are thereby minimized. That is, noise in the signal attributable to laser fluctuations is thus substantially eliminated from the resultant signal $SH_N$. This normalization is crucial for achieving good signal-to-noise ratio since any change in intensity from the incident laser beam will be amplified quadratically in the generated second harmonic light due to the non-linear dependence of the second harmonic generation. Furthermore, with respect to the laser light, the fluency of the laser's 10 ns pulse has been limited to approximately 5 mJ/cm², which is well below the damage threshold for the film 10 or substrate 20.

Figure 2:
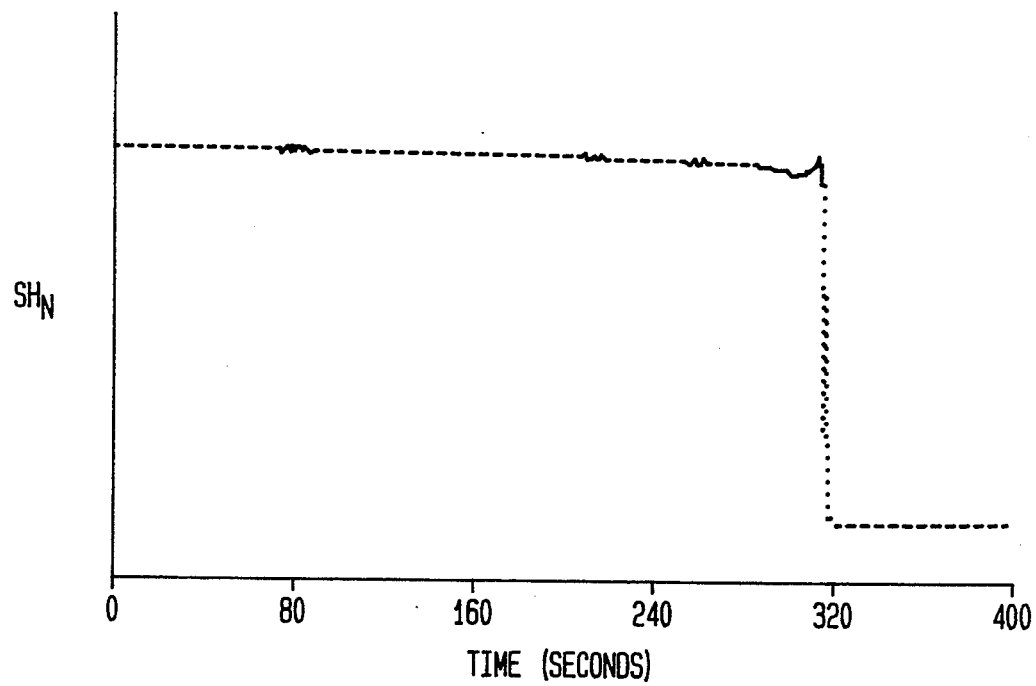
FIG. 2 illustrates a representative graph of a normalized etching characteristic signal versus time.

Referring now to FIG. 2, a plot of the normalized detected second harmonic component signal $SH_N$ is shown versus time (in units of seconds). This plot is representative of the signal $SH_N$ for the previously mentioned example of the etching of an SiO₂ film on a Si substrate in a BHF etching solution. As can be seen from FIG. 2, a distinct change in the signal $SH_N$ occurs between approximately 315 and 325 seconds. That is, an abrupt change in $SH_N$, on the order of seconds, occurs as a function of time. This distinct change in the signal $SH_N$ corresponds to the abrupt change taking place at the interface 12 associated with substrate 20, that is, a distinct change in the interface characteristics associated with substrate 20. In the example, this abrupt change occurs when the SiO₂ film has been etched away thus exposing the silicon surface of the substrate to the BHF etchant solution. Furthermore, the observed time for the abrupt change in the $SH_N$ signal shown in FIG. 2 correlates with the removal of SiO₂ film by observing the change of surface behavior from hydro-philic to hydro-phobic. Therefore, the shift or abrupt change in signal $SH_N$ is representative of an etching endpoint for the etching of film 10 upon substrate 20.

Figure 3:
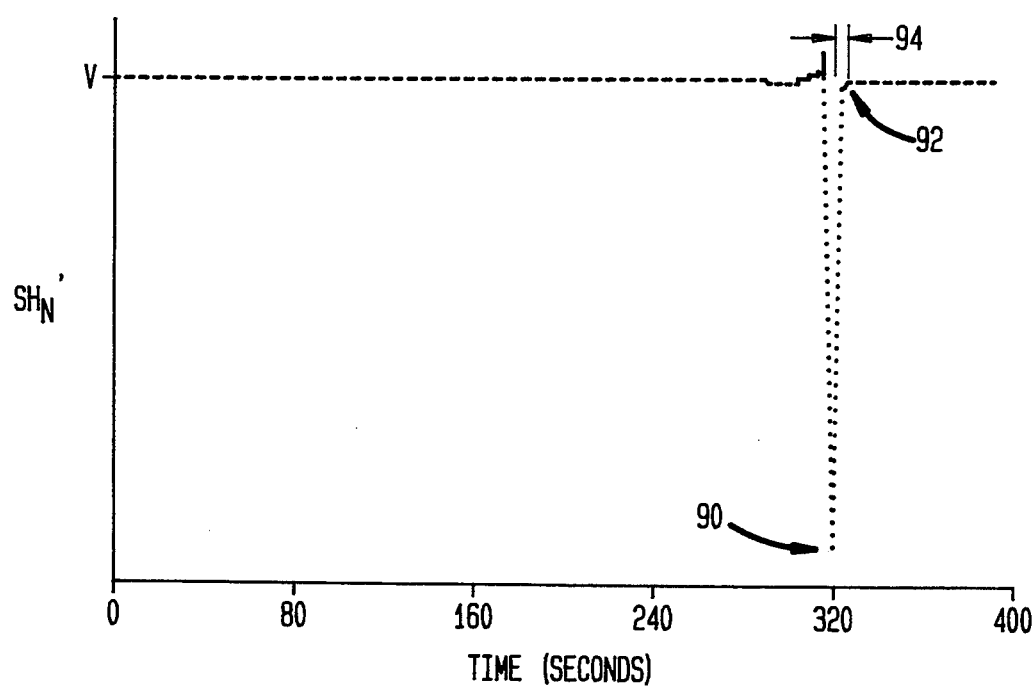
FIG. 3 illustrates a representative graph of a derivative of the normalized etching characteristic signal of FIG. 2 taken in real-time.

Referring now to FIG. 3, a plot of the real-time derivatives of the sequence of curve fitting expressions generated by control means 82 as a function of time (in units of seconds) is shown. The sequence of curve fitting expressions are generated in real-time for a successive series of a prescribed number of data points taken from the normalized output signal, $SH_N$, as previously discussed. A baseline value V and a negative peak (indicated by the numeral 90) in the real-time derivative are shown in FIG. 3. The minimum of the negative peak 90 is representative of a precursor to an etching endpoint indicated by numeral 92. That is, control means 82 monitors the real-time derivative data and determines at what point in time the minimum of the peak 90 occurs. Based upon the minimum of peak 90, control means 82 determines the prescribed change in the normalized detected second harmonic component that is representative of the etching endpoint 92 as a function of the peak 90. Appropriate control of the etching solution 30 or the removal of the substrate from the etching bath may then be accomplished automatically using the above mentioned change in FIG. 2 or FIG. 3 to advantageously tailor the etching of substrate for ensuring precise etching control.

In the manner described above, the negative peak 90 advantageously acts as an early warning indicator of the etching end point 92. An early warning period, indicated by numeral 94, may be advantageously utilized to perform any necessary steps to ensure the termination of the etching of the wafer upon the reaching of the etching endpoint 92. Thus, control means 82 advantageously determines a prescribed change in the normalized detected second harmonic component signal representative of the etching endpoint.

In further discussion of the above, control means 82 is responsive to the third output signal, $SH_E$, for controlling the termination of etching of the film on the substrate. Control means 82 is operable for terminating the etching of the film i) in a first mode by adjusting an effective etchant concentration of an etching solution, and/or ii) in a second mode by physically removing the substrate from the etching solution. In the first mode, control means 82 controls pump 34 for adjusting an effective etchant concentration of the etching solution, i.e., for diluting the etching solution to become less concentrated with the etchant as a function of the etching endpoint signal. For example, etching solution 30 may be neutralized by removing a flow of etchant chemicals into the bath and replacing the same with a flow of neutral solution, such as deionized water. In a second mode, control means 82 operatively controls a means, such as a robotic arm (not shown), to physically remove the substrate out of the etchant bath as a function of the etching endpoint signal. Control means 82 may further provide an output signal, or suitable signal such as an audible alarm, indicative of the occurrence of the early warning period 94. Such an early warning period signal would enable for appropriate steps to be taken, or at least begun, in preparation for termination of the etching of the substrate in instances where the flow of etching solution or the removal of the substrate from the etchant bath are manually controlled.

While the method and apparatus of the present invention have been discussed with reference to an example of etching an $SiO_2$ film on a silicon substrate in a wet etching bath, it should be understood that the method and apparatus of the present invention are applicable for use in other types of etch environments, such as, vapor etch and dry etch, further such as, reactive ion etching (RIE) in a plasma etch chamber, as well. The present method and apparatus advantageously utilize the effects of an abrupt change in surface/interface characteristic of a film being etched. With appropriate modification of incident angle of the laser beam with respect to the surface normal of the film being etched and appropriate selection of excitation frequency, light polarization, pulse width, repetition rate, and power level, as well as associated detection systems, such as PMT and electronics, the present invention can be applied to other silicon orientations.

The present invention, as presented above, thus advantageously provides for monolayer detection sensitivity and monolayer resolution at a film/substrate or film/film interface. As indicated above, this capability results from the surface-specific nature of the measurement of the generated second harmonic response. The surface-specific character of the second harmonic radiation arises from the selection rule that prohibits a second-order nonlinear response in centrosymmetric media within the electric dipole approximation. This therefore advantageously allows for the precise control of an etching endpoint for situations in which overetching can destroy sidewalls or undercut layers causing problems with subsequent process steps.

There has thus been provided a novel and non-obvious method and apparatus for real-time, in-situ monitoring and closed loop control of an etching process of a film on a substrate.

While the invention has been particularly shown and described with reference to the preferred embodiment thereof, it will be understood by those skilled in the art that various changes in form and detail may be made therein without departing from the spirit and scope of the invention. For example, a suitable means can be provided for scanning or translating the monitoring apparatus of the present invention to various positions across the wafer so as to detect or monitor the etching process at those various positions. Similarly, multiple positions on the wafer could be monitored simultaneously using multiple fundamental beams and corresponding detection means.

What is claimed is:

1. An apparatus for real-time in-situ detection of an etching endpoint of a film on a substrate during etching of the film, said apparatus comprising:

a) means for providing a first excitation beam of light, the first light beam having a wavelength and furthermore substantially containing only a first harmonic component of light at that wavelength;

b) means for directing the first light beam at a prescribed incident angle to an interface between the film and the substrate, the first light beam being reflected off the interface to thereby provide a second light beam, the second light beam containing the first harmonic component of the first light beam and a generated second harmonic component, the second harmonic component thereof being generated as a result of the reflection of the first light beam off the interface;

c) means for detecting the generated second harmonic component of the first light beam, said detecting means providing a first output signal representative of the detected second harmonic component;

d) means for producing a generated second harmonic component reference of the first light beam, said second harmonic component reference producing means providing a second output signal representative of a generated second harmonic component reference, wherein said second harmonic component reference means comprises i) a beam splitter positioned intermediate said first light beam providing means and said directing means for partially reflecting and partially transmitting the first light beam, the partially reflected portion of the first light beam providing a fourth light beam, wherein the partially transmitted portion of the first light beam is received by said directing means, ii) a third interference filter for filtering the fourth light beam to remove substantially all but a first harmonic component of the fourth light beam, iii) a reference medium for receiving the fourth light beam on a first side thereof and providing a fifth light beam exiting from a second side thereof, the fifth light beam containing the first harmonic component and a generated reference second harmonic component, iv) a specially coated dichroic mirror for efficiently reflecting the generated reference second harmonic component and efficiently transmitting the first harmonic component of the fifth light beam, the reflected portion of the fifth light beam providing a sixth light beam, v) a fourth interference filter for further removing any residual first harmonic component light from the sixth light beam to provide a seventh light beam, the seventh light beam containing substantially the generated reference second harmonic component of the fifth light beam, and vi) a second monochrometer equipped with a photomultiplier tube for receiving the seventh light beam, said second monochrometer providing the second output signal representative of the second harmonic component reference; and e) means responsive to the first and second output signals for normalizing the generated second harmonic component of the first light beam detected by said detection means in real-time, said real-time normalizing means providing a third output signal representative of an occurrence of a prescribed change in the normalized detected second harmonic component of the first light beam, the prescribed change corresponding to an etching endpoint of the film on the substrate.

2. The apparatus of claim 1, wherein
said first light beam providing means comprises a YAG laser for producing light having a wavelength of 1.06 μm, said first light beam providing means further comprising a first interference filter for filtering the YAG laser light to substantially contain only a first harmonic component thereof.

3. The apparatus of claim 1, wherein
said first light beam directing means comprises a specially coated dichroic mirror for efficiently reflecting the first light beam and for efficiently transmitting the second light beam.

4. The apparatus of claim 1, wherein
said second harmonic component detecting means comprises i) a second interference filter for filtering the second light beam to provide a third light beam, the third light beam containing substantially only the generated second harmonic component of the first light beam, and ii) a first monochrometer equipped with a photomultiplier tube for receiving the third light beam, said first monochrometer providing the first output signal representative of the detected second harmonic component.

5. The apparatus of claim 1, wherein
said real-time normalizing means comprises means for receiving the first and second output signals and normalizing the first output signal by the second output signal to provide a normalized output signal, said normalizing means further for i) generating a sequence of curve fitting expressions in real-time for a successive series of a prescribed number of data points taken from the normalized output signal, ii) taking a real-time derivative of the sequence of expressions, iii) determining a prescribed peak in the real-time derivative, the peak representative of a precursor to the etching endpoint, and iv) determining the prescribed change in the normalized detected second harmonic component representative of the etching endpoint as a function of the peak.

6. The apparatus of claim 1, further comprising:
f) means responsive to the third output signal for controlling a termination of etching of the film on the substrate.

7. The apparatus of claim 6, wherein
said first light beam providing means comprises a YAG laser for producing light having a wavelength of 1.06 μm, said first light beam providing means further comprising a first interference filter for filtering the YAG laser light to substantially contain only a first harmonic component thereof.

8. The apparatus of claim 6, wherein
said first light beam directing means comprises a specially coated dichroic mirror for efficiently reflecting the first light beam and for efficiently transmitting the second light beam.

9. The apparatus of claim 6, wherein
said second harmonic component detecting means comprises i) a second interference filter for filtering the second light beam to provide a third light beam, the third light beam containing substantially only the generated second harmonic component of the first light beam, and ii) a first monochrometer equipped with a photomultiplier tube for receiving the third light beam, said first monochrometer providing the first output signal representative of the detected second harmonic component.

10. The apparatus of claim 6, wherein
said real-time normalizing means comprises means for receiving the first and second output signals and normalizing the first output signal by the second output signal to provide a normalized output signal, said normalizing means further for i) generating a sequence of curve fitting expressions in real-time for a successive series of a prescribed number of data points taken from the normalized output signal, ii) taking a real-time derivative of the sequence of expressions, iii) determining a prescribed peak in the real-time derivative, the peak representative of a precursor to the etching endpoint, and iv) determining the prescribed change in the normalized detected second harmonic component representative of the etching endpoint as a function of the peak.

11. The apparatus of claim 6, wherein:
said control means is operable for terminating the etching of the film by physically removing the substrate from an etching environment.

12. The apparatus of claim 6, wherein:
said control means is operable for terminating the etching of the film by adjusting an effective etchant concentration of an etching environment.

13. The apparatus of claim 1, further comprising:
f) means positioned intermediate said first excitation light beam providing means and said directing means for rotating a polarization of the first light beam.

14. The apparatus of claim 13, wherein
said first light beam providing means comprises a YAG laser for producing light having a wavelength of 1.06 μm, said first light beam providing means further comprising a first interference filter for filtering the YAG laser light to substantially contain only a first harmonic component thereof.

15. The apparatus of claim 13, wherein
said first light beam directing means comprises a specially coated dichroic mirror for efficiently reflecting the first light beam and for efficiently transmitting the second light beam.

16. The apparatus of claim 13, wherein
said second harmonic component detecting means comprises i) a second interference filter for filtering the second light beam to provide a third light beam, the third light beam containing substantially only the generated second harmonic component of the first light beam, and ii) a first monochrometer equipped with a photomultiplier tube for receiving the third light beam, said first monochrometer providing the first output signal representative of the detected second harmonic component.

17. The apparatus of claim 13, wherein
said real-time normalizing means comprises means for receiving the first and second output signals and normalizing the first output signal by the second output signal to provide a normalized output signal, said normalizing means further for i) generating a sequence of curve fitting expressions in real-time for a successive series of a prescribed number of data points taken from the normalized output signal, ii) taking a real-time derivative of the sequence of expressions, iii) determining a prescribed peak in the real-time derivative, the peak representative of a precursor to the etching endpoint, and iv) determining the prescribed change in the normalized detected second harmonic component representative of the etching endpoint as a function of the peak.

18. The apparatus of claim 13, further comprising:
g) means responsive to the third output signal for controlling a termination of etching of the film on the substrate.

19. The apparatus of claim 18, wherein:
said control means is operable for terminating the etching of the film by physically removing the substrate from an etching environment.

20. The apparatus of claim 18, wherein:
said control means is operable for terminating the etching of the film by adjusting an effective etchant concentration of an etching solution.

21. A method for real-time in-situ detection of an etching endpoint of a film on a substrate during etching of the film, said method comprising the steps of:
a) providing a first excitation beam of light, the first light beam having a wavelength and furthermore substantially containing only a first harmonic component of light at that wavelength;
b) directing the first light beam at a prescribed incident angle to an interface between the film and the substrate, the first light beam being reflected off the interface to thereby provide a second light beam, the second light beam containing the first harmonic component of the first light beam and a generated second harmonic component, the second harmonic component thereof being generated as a result of the reflection of the first light beam off the interface;
c) detecting the generating second harmonic component of the first light beam and providing a first output signal representative of the detected second harmonic component;
d) producing a generated second harmonic component reference of the first light beam and providing a second output signal representative of a generated second harmonic component reference, wherein producing the generated second harmonic component reference further comprises i) providing a beam splitter positioned for partially reflecting and partially transmitting the first light beam, the partially reflected portion of the first light beam providing a fourth light beam, ii) providing a third interference filter for filtering the fourth light beam to remove substantially all but a first harmonic component of the fourth light beam, iii) providing a reference medium for receiving the fourth light beam on a first side thereof to provide a fifth light beam exiting from a second side thereof, the fifth light beam containing the first harmonic component and a generated reference second harmonic component, iv) providing a specially coated dichroic mirror for efficiently reflecting the generated reference second harmonic component and efficiently transmitting the first harmonic component of the fifth light beam, the reflected portion of the fifth light beam providing a sixth light beam, v) providing a fourth interference filter for further removing any residual first harmonic component light from the sixth light beam to provide a seventh light beam, the seventh light beam containing substantially the generated reference second harmonic component of the fifth light beam, and vi) providing a second monochrometer equipped with a photomultiplier tube for receiving the seventh light beam, the second monochrometer providing the second output signal representative of the second harmonic component reference; and
e) normalizing the generated second harmonic component of the first light beam detected by said detection means in real-time as a function of the first and second output signals, said normalizing step further providing a third output signal representative of an occurrence of a prescribed change in the normalized detected second harmonic component of the first light beam, the prescribed change corresponding to an etching endpoint of the film on the substrate.

22. The method of claim 21, wherein
providing the first light beam further comprises providing a YAG laser for producing light having a wavelength of 1.06 $\mu$m and further providing a first interference filter for filtering the YAG laser light to substantially contain only a first harmonic component thereof.

23. The method of claim 21, wherein
directing the first light beam further comprises providing a specially coated dichroic mirror for efficiently reflecting the first light beam and for efficiently transmitting the second light beam.

24. The method of claim 21, wherein
detecting the generated second harmonic component further comprises i) providing a second interference filter for filtering the second light beam to provide a third light beam, the third light beam containing substantially only the generated second harmonic component of the first light beam, and ii) providing a first monochrometer equipped with a photomultiplier tube for receiving the third light beam, the first monochrometer providing the first output signal representative of the detected second harmonic component.

25. The method of claim 21, wherein
normalizing the generated second harmonic component further comprises providing a means for receiving the first and second output signals and normalizing the first output signal by the second output signal to provide a normalized output signal, said normalizing step further i) generating a sequence of curve fitting expressions in real-time for a successive series of a prescribed number of data points taken from the normalized output signal, ii) taking a real-time derivative of the sequence of expressions, iii) determining a prescribed peak in the real-time derivative, the peak representative of a prescursor to the etching endpoint, and iv) determining the prescribed change in the normalized detected second harmonic component representative of the etching endpoint as a function of the peak.

26. The method of claim 21, further comprising the step of:
f) controlling a termination of etching of the film on the substrate in response to the third output signal.

27. The method of claim 26, wherein
providing the first light beam further comprises providing a YAG laser for producing light having a wavelength of 1.06 $\mu$m and further providing a first interference filter for filtering the YAG laser light to substantially contain only a first harmonic component thereof.

28. The method of claim 26, wherein directing the first light beam further comprises providing a specially coated dichroic mirror for efficiently reflecting the first light beam and for efficiently transmitting the second light beam.

29. The method of claim 26, wherein
detecting the generated second harmonic component further comprises i) providing a second interference filter for filtering the second light beam to provide a third light beam, the third light beam containing substantially only the generated second harmonic component of the first light beam, and ii) providing a first monochrometer equipped with a photomultiplier tube for receiving the third light beam, the first monochrometer providing the first output signal representative of the detected second harmonic component.

30. The method of claim 26, wherein
normalizing the generated second harmonic component further comprises providing a means for receiving the first and second output signals and normalizing the first output signal by the second output signal to provide a normalized output signal, said normalizing step further i) generating a sequence of curve fitting expressions in real-time for a successive series of a prescribed number of data points taken from the normalized output signal, ii) taking a real-time derivative of the sequence of expressions, iii) determining a prescribed peak in the real-time derivative, the peak representative of a precursor to the etching endpoint, and iv) determining the prescribed change in the normalized detected second harmonic component representative of the etching endpoint as a function of the peak.

31. The method of claim 26, wherein:
controlling the termination of the etching of the film further comprises physically removing the substrate from an etching environment.

32. The method of claim 26, wherein:
controlling the termination of the etching of the film further comprises adjusting an effective etchant concentration of an etching environment.

33. The method of claim 21, further comprising the step of:
f) rotating a polarization of the first light beam.

34. The method of claim 33, wherein
providing the first light beam further comprises providing a YAG laser for producing light having a wavelength of 1.06 μm and further providing a first interference filter for filtering the YAG laser light to substantially contain only a first harmonic component thereof.

35. The method of claim 33, wherein
directing the first light beam further comprises providing a specially coated dichroic mirror for efficiently reflecting the first light beam and for efficiently transmitting the second light beam.

36. The method of claim 33, wherein
detecting the generated second harmonic component further comprises i) providing a second interference filter for filtering the second light beam to provide a third light beam, the third light beam containing substantially only the generated second harmonic component of the first light beam, and ii) providing a first monochrometer equipped with a photomultiplier tube for receiving the third light beam, the first monochrometer providing the first output signal representative of the detected second harmonic component.

37. The method of claim 33, wherein
normalizing the generated second harmonic component further comprises providing a means for receiving the first and second output signals and normalizing the first output signal by the second output signal to provide a normalized output signal, said normalizing step further i) generating a sequence of curve fitting expressions in real-time for a successive series of a prescribed number of data points taken from the normalized output signal, ii) taking a real-time derivative of the sequence of expressions, iii) determining a prescribed peak in the real-time derivative, the peak representative of a precursor to the etching endpoint, and iv) determining the prescribed change in the normalized detected second harmonic component representative of the etching endpoint as a function of the peak.

38. The method of claim 33, still further comprising the step of:
g) controlling a termination of etching of the film on the substrate in response to the third output signal.

39. The method of claim 38, wherein:
controlling the termination of the etching of the film further comprises physically removing the substrate from an etching environment.

40. The method of claim 38, wherein:
controlling the termination of the etching of the film further comprises adjusting an effective etchant concentration of an etching environment.

* * * * *